United States Patent
Inoue et al.

(10) Patent No.: US 8,780,222 B2
(45) Date of Patent: Jul. 15, 2014

(54) IMAGE PROCESSING APPARATUS THAT PRODUCES A HIGHER RESOLUTION IMAGE, IMAGE PICKUP APPARATUS AND IMAGE PROCESSING PROGRAM

(75) Inventors: Chiaki Inoue, Utsunomiya (JP); Koshi Hatakeyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 412 days.

(21) Appl. No.: 13/044,920

(22) Filed: Mar. 10, 2011

(65) Prior Publication Data

US 2011/0228120 A1 Sep. 22, 2011

(30) Foreign Application Priority Data

Mar. 16, 2010 (JP) ................... 2010-059176

(51) Int. Cl.
*H04N 5/228* (2006.01)

(52) U.S. Cl.
USPC ..................... 348/222.1; 348/240.2

(58) Field of Classification Search
CPC ....... G06T 3/4053; G06T 3/4076; G06T 3/40; G06T 3/4007; G06T 3/4023
USPC ................ 348/222.1, 240–241; 382/299, 300
See application file for complete search history.

(56) References Cited

U.S. PATENT DOCUMENTS

| 2008/0030592 A1* | 2/2008 | Border et al. ............... 348/218.1 |
| 2008/0186390 A1* | 8/2008 | Sato et al. .................... 348/222.1 |
| 2010/0238327 A1* | 9/2010 | Griffith et al. ........... 348/240.99 |
| 2011/0064327 A1* | 3/2011 | Dagher et al. ................. 382/263 |

FOREIGN PATENT DOCUMENTS

| JP | 2000-298300 A | 10/2000 |
| JP | 2002-341396 A | 11/2002 |
| JP | 2007-135133 A | 5/2007 |
| JP | 2008-079123 A | 4/2008 |
| JP | 2009-244944 A | 10/2009 |
| WO | 2006/041127 A1 | 4/2006 |
| WO | 2007/139067 A1 | 12/2007 |

OTHER PUBLICATIONS

Richardson, William H. "Bayesian-Based Iterative Method of Image Restoration," Journal of the Optical Society of America, vol. 62, No. 1, Jan. 1972, pp. 55-59.
Japanese Office Action for corresponding JP 2010-059176, mail date Jan. 7, 2014.
Office Action issued in Counterpart Japanese Patent Appln. No. 2010-59176, dated May 13, 2014.

* cited by examiner

*Primary Examiner* — Nelson D. Hernández Hernández
(74) *Attorney, Agent, or Firm* — Rossi, Kimms & McDowell LLP

(57) ABSTRACT

The image processing apparatus includes an image obtaining part configured to obtain a first image and a second image. The first image is an image generated by image capturing or generated by expanding part of the captured image and includes a first object image. The second image corresponds to an image captured at a higher image capturing magnification than that for the first image and includes a second object image corresponding to part of the first object image. The apparatus includes a processing part configured to produce a third image whose resolution is higher than that of the first image by performing image processing on the first image using the second image as a constraint condition.

6 Claims, 7 Drawing Sheets

IMAGE PROCESSING APPARATUS THAT PRODUCES A HIGHER RESOLUTION IMAGE, IMAGE PICKUP APPARATUS AND IMAGE PROCESSING PROGRAM

BACKGROUND OF THE INVENTION

1. Field of the Invention

The present invention relates to an image processing technique for producing a higher resolution image from an image obtained by image capturing.

2. Description of the Related Art

Image pickup apparatuses such as digital still cameras include ones capable of performing optical zooming and digital zooming. For example, Japanese Patent Laid-Open No. 2002-341396 discloses a camera that performs digital zooming between steps of optical step zooming to enable continuous zooming while having such an optical step zooming function.

However, since conventional digital zooming methods perform resolution conversion by image interpolation processing such as linear interpolation processing or bilinear processing, a large digital zoom magnification degrades quality of the image (resolution).

Japanese Patent Laid-Open No. 2007-135133 discloses an image pickup apparatus that produces a high-resolution image by using a plural-image super-resolution technology utilizing plural images captured near a telephoto end of optical zooming, and that performs digital zoom processing on the high-resolution image. Producing such an image whose resolution is higher than that of the captured image by using the plural-image super-resolution technology makes it possible to suppress resolution degradation due to the digital zoom processing.

In addition, methods of the super-resolution technology include an ML (Maximum-Likelihood) method, an MAP (Maximum A Posterior) method, a POCS (Projection Onto Convex Set) method, an IBP (Iterative Back Projection) method and an LR (Lucy-Richardson) method. The LR method disclosed in "Bayesian-based iterative method of image restoration" (W. H. Richardson, J. Opt. Soc. Am. A, 1972, Volume 62, p. 55-59) normalizes an illuminance distribution of an original image or an illuminance distribution of a degraded image to obtain a distribution of a probability density function. The LR method makes it possible to treat a point spread function (PSF) that is a transfer function of an optical system as the distribution of the conditional probability density function. Then, the LR method performs iterative calculation to estimate, on the basis of Bayes statistics, a most probable distribution of the original image for the distribution of the degraded image, by using the distribution of the degraded image and the distribution of the SPF (that is, the distribution of the probability density function).

International Publication WO2006-041127 discloses a method for restoring a more accurate original image by using an optical transfer function (OTF) in place of the PSF used in the LR method, the OTF easily containing an accurate phase characteristic.

However, the plural-image super-resolution technology disclosed in Japanese Patent Laid-Open No. 2007-135133 requires storing of a lot of images (for example, ten images) to a memory, which increases a required capacity of the memory.

Moreover, the conventional plural-image super-resolution technology requires knowing of an accurate transfer characteristic (transfer function) of an image taking optical system in order to estimate an entire image with high resolution from only a low-resolution image. However, it is generally difficult to accurately evaluate the transfer characteristic of the image taking optical system since the transfer characteristic depends on parameters such as various aberrations of lenses constituting the image taking optical system, an object illumination wavelength and an aperture size of an image-pickup element. Moreover, it is not general to individually measure and use the transfer characteristic of the image taking optical systems provided to each image pickup apparatus. Even if estimating a high-resolution image based on an inaccurate transfer characteristic of the image taking optical system, it is impossible to produce a good high-resolution image.

SUMMARY OF THE INVENTION

The present invention provides an image processing apparatus, an image pickup apparatus and an image processing program capable of producing a good high-resolution image by adding an appropriate constraint condition to image processing using the super-resolution technology.

The present invention provides as an aspect thereof an image processing apparatus including an image obtaining part configured to obtain a first image and a second image, the first image being an image generated by image capturing or generated by expanding part of the image generated by the image capturing, the first image including a first object image, the second image corresponding to an image captured at a higher image capturing magnification than that for the first image, and the second image including a second object image corresponding to part of the first object image, and a processing part configured to produce a third image whose resolution is higher than that of the first image by performing image processing on the first image using the second image as a constraint condition.

The present invention provides as another aspect thereof an image pickup apparatus including the above image processing apparatus.

The present invention provides as still another aspect thereof an image processing program for causing a computer to perform processing including a step of obtaining a first image and a second image, the first image being an image generated by image capturing or generated by expanding part of the image generated by the image capturing, the first image including a first object image, the second image corresponding to an image captured at an image capturing magnification higher than that for the first image, and the second image including a second object image corresponding to part of the first object image, and a step of producing a third image whose resolution is higher than that of the first image by performing image processing on the first image using the second image as a constraint condition.

Further features of the present invention will become apparent from the following description of exemplary embodiments with reference to the attached drawings.

DESCRIPTION OF THE PREFERRED EMBODIMENTS

Figure 1:
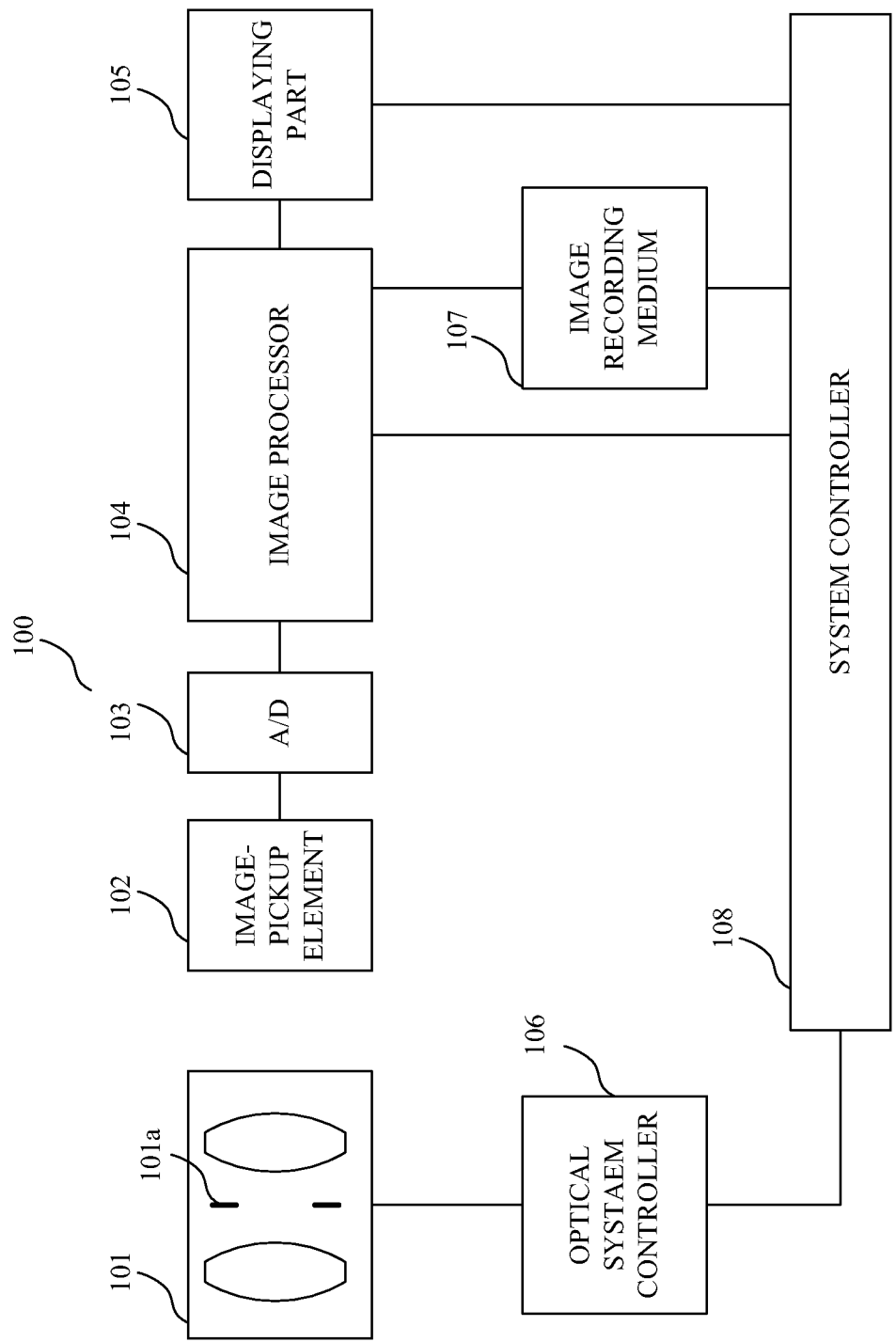
FIG. 1 is a block diagram showing a configuration of an image pickup apparatus that is Embodiment 1 of the present invention.

Exemplary embodiments of the present invention will hereinafter be described with reference to the accompanying drawings.

First, a super-resolution technology that is used in the following specific embodiments will be described before explanation of the embodiments.

(Principle of Super-Resolution)

Description will be made of a method for image restoration on the basis of Bayesian statistics, using as an example a case of a one-dimensional black and white image. An object is referred to as an "original image", and an image generated by image capturing performed by an image pickup apparatus through an image taking optical system and an image (digital zoom image) generated by electrically expanding the image (captured image) generated by the image capturing are referred to as a "degraded image". Moreover, a technology to generate (restore) an image near the original image from the degraded image by image restoration is referred to as a "super-resolution technology", and the restored image is referred to as a "high resolution image".

When $g(x)$ represents the degraded image that is expressed as a one-dimensional vector, and $f(x)$ represents the original image that corresponds to the degraded image and is expressed as a one-dimensional vector, these two images satisfy the following relationship:

$$g(x) = h(x) \times f(x) \tag{1}$$

where $h(x)$ represents a PSF that is a transfer characteristic (transfer function) of the image taking optical system.

In the Bayesian statistics, a posterior probability is calculated by using a Bayesian formula from a normal process in which the original image is converted into the degraded image, the posterior probability being a probability at which a reverse process is caused, and the original image is estimated from the degraded image on the basis of the posterior probability.

When $P(f(x))$ represents a probability density function of an event in which the original image f exists, $P(g(x))$ represents a probability density function of an event in which the degraded image g is generated, and $F(g(x)|f(x))$ represents a conditional probability density function of the degraded image g under a condition that the original image f is given, the Bayesian formula is expressed by:

$$P(f(x) \mid g(x)) = \frac{P(g(x) \mid f(x))P(f(x))}{P(g(x))} \tag{2}$$

In the above formula, $P(f(x)|g(x))$ represents a conditional probability density distribution of the original image f under a condition that the degraded image g is given, and is referred to as a "posterior probability density function".

When the original image f and the degraded image g satisfy the Bayesian formula, the images f and g can be considered to be normalized, and thus can be treated as the probability density functions.

When $f(x_1)$ represents an event in which a point light source exists at a coordinate of $x_1$ in the original image, and $g(x2)$ represents an event in which an image is formed at a coordinate of $x_2$ in the degraded image, the following relationships are established:

$$P(f(x_1)) = f(x_1) \tag{3}$$

$$P(g(x_2)) = g(x_2) \tag{4}$$

Moreover, $P(g(x_2)|f(x_1))$ can be expressed as follows by using h that is the PSF of the image taking optical system:

$$P(g(x_2)|f(x_1)) = h(x_2 - x_1) \tag{5}$$

Thus, the expressions (2) to (5) show that a distribution of the original image forming an image at the coordinate of $x_2$ in the degraded image can be estimated from the following expression:

$$P(f(x) \mid g(x_2)) = \frac{h(x_2 - x)f(x)}{g(x_2)} \tag{6}$$

Moreover, from a definition of a marginal probability, the following expression is established:

$$P(g(x)) = \int_{-\infty}^{\infty} P(f(x), g(x)) dx = \int_{-\infty}^{\infty} P(g(x)|f(x))P(f(x)) dx \tag{7}$$

In other words, the expression (6) can be further expressed as follows:

$$P(f(x) \mid g(x_2)) = \frac{h(x_2 - x)f(x)}{\int_{-\infty}^{\infty} P(g(x_2) \mid f(x_1))P(f(x_1))dx_1} \tag{8}$$

$$= \frac{h(x_2 - x)f(x)}{\int_{-\infty}^{\infty} h(x_2 - x_1)f(x_1)dx_1}$$

Multiplying both sides of the expression (8) by $P(g(x_2)) = g(x_2)$ and integrating the expression (8) after the multiplication can provide the following left side of the resulting expression (8) from the definition of the marginal probability:

$$\int_{-\infty}^{\infty} P(f(x)|g(x_2))P(g(x_2))dx_2 = P(f(x)) = f(x) \tag{9}$$

Moreover, the above multiplication and integration can provide the following right side of the resulting expression (8):

$$f(x) \int_{-\infty}^{\infty} \frac{h(x_2 - x)g(x_2)}{\int_{-\infty}^{\infty} h(x_2 - x_1)f(x_1)dx_1} dx_2 \tag{10}$$

The above-described relationship is established when $f(x)$ shows a true original image. In other words, calculation of $f(x)$ corresponds to restoration of the original image from the degraded image.

Performing iterative calculation of the following estimation expression (11) where $f_{k+1}(x)$ represents $f(x)$ in the expression (9) and $f_k(x)$ represents f(x) in the expression (10) can provide a convergence value of $f_k$, that is, the distribution of the original image:

$$f_{k+1}(x) = f_k(x) \int_{-\infty}^{\infty} \frac{h(x_2 - x)g(x_2)}{\int_{-\infty}^{\infty} h(x_2 - x_1)f(x_1))dx_1} dx_2 \quad (11)$$

Using such a restoration method on the basis of the Bayesian statistics makes it possible to restore an unknown original image from a known degraded image and a known transfer characteristic of the image taking optical system. Similarly, it is possible to restore an unknown transfer characteristic of the image taking optical system from a known degraded image and a known original image corresponding thereto. Moreover, it is also possible to restore the original image by using, as the transfer characteristic of the image taking optical system, in place of the PSF, an OTF (Optical Transfer Function) that is a Fourier transform of the PSF and includes an accurate phase characteristic.

Moreover, in a case of using the MAP method as another method, calculation of f(x) maximizing a value of the posterior probability density function (posterior probability density) shown by the following expression (12) is employed:

$$f(x) = \arg\max P(f(x)|g(x)) \propto P(g(x)|f(x))P(f(x)) \quad (12)$$

When assuming that the degraded image includes a Gauss noise n and defining h(x) which is the PSF of the image taking optical system as a convolution matrix of m×m that is a linear operator, the degraded image g(x) and the original image f(x) can be expressed as the following expression (13):

$$g(x) = C \times f(x) + n \quad (13)$$

The matrix C is a degradation function, and may include not only the PSF but also a degrading factor due to a system of the image pickup apparatus.

Based on the above-described assumption, f(x) maximizing the posterior probability density in the expression (12) corresponds to f(x) minimizing the following evaluation function T(f) from the expression (13):

$$T(f) = \|g(x) - C \times f(x)\|^2 + \alpha Z(f) \quad (14)$$

where Z(f) represents a constraint function (that is, a function corresponding to a constraint condition) including a constraint term relating to image smoothness and an additional condition, and α represents a weighting factor. The calculation of f(x) minimizing the evaluation function T(f) can be performed by using conventional methods such as a steepest descent method.

Calculating f(x) minimizing T(f) shown by the expression (14) corresponds to the restoration of the original image from the degraded image (actually, corresponds to production of a high-resolution image equal to or near the original image)

(Concept of Image Processing)

Next, description will be made of image processing to restore the original image from the degraded image in embodiments of the present invention.

In order to restore the original image from the degraded image by using the estimation expression (11) and the evaluation function T(f) shown by the expression (14), it is necessary to set an initially estimated distribution f. As the initially estimated distribution f, the degraded image g that is generated by image capturing at a same image capturing magnification as that for the restored original image is generally used. Furthermore, the transfer characteristic of the image taking optical system such as the PSF or the OTF and the constraint term (constraint condition) obtained from the additional condition or the like are important.

However, the transfer characteristic of the image taking optical system depends on parameters such as aberrations of lenses constituting that image taking optical system, a wavelength of light with which an object is illuminated and an aperture size of an image pickup element (image sensor) provided in the image pickup apparatus, and therefore is generally difficult to be accurately estimated. Thus, although a Gaussian distribution is generally used as the PSF that is an initial condition for the sake of simplicity, it is rare that the PSF of an actual image taking optical system (or of an image capturing part including the image taking optical system and the image pickup element) is identical to the Gaussian distribution, which increases an estimation error in almost all cases. Moreover, although it is possible to estimate the PSF from the degraded image according to the above-described principle, it is difficult to estimate an accurate PSF since various information is lacked in the degraded image.

Therefore, each embodiment of the present invention improves accuracy of the super-resolution technology by adding thereto a new and strong constraint condition. The "strong constraint condition" is an image (hereinafter referred to as a "constraint image") whose image capturing magnification is higher than that for the degraded image, in other words, an image whose partial region has higher resolution than those of other regions.

Figure 4:
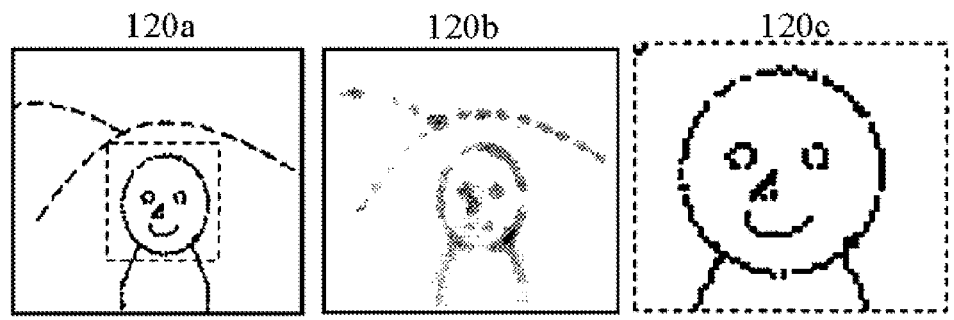
FIG. 4 shows captured images in Embodiment 1.

Specifically, as shown in FIG. 4, image capturing of an object (original image) 120a generates an image (first image) 120b as a degraded image. Moreover, image capturing after expanding part of the object 120a (part surrounded by a broken line in the object 120a), that is, image capturing at a higher image capturing magnification (second image capturing magnification) than an image capturing magnification (first image capturing magnification) for the degraded image generates an image 120c as the constraint image. The constraint image corresponds to a second image.

The constraint image shows image information of part of the degraded image in detail with higher resolution (or a higher resolving power) than that of the degraded image. In other words, the constraint image includes a higher frequency component of the object than that in the degraded image. The constraint image including such a higher frequency component enables more accurate estimation of the PSF of, for example, a central part where a main object exists in the degraded image, which makes it possible to restore the original image with higher accuracy than conventional methods by the iterative calculation using the expression (11). Moreover, the constraint image enables acquisition of detailed image information of a partial region of the degraded image before start of the restoration, which makes it possible to further increase the accuracy of the restoration of the original image, by adding to the estimation function shown by the expression (14) a correlation function in which a correlation of the constraint image and the partial region of the degraded image.

Hereafter, specific embodiments of the present invention will be described.

Embodiment 1

FIG. 1 shows a basic configuration of an image pickup apparatus that is a first embodiment (Embodiment 1).

Light from an object (not shown) passes through an image taking optical system 101 to form an object image on an image-pickup element (image sensor) 102. The image taking optical system 101 includes plural lenses such as a magnification-varying lens and a focus lens, and an aperture stop 101a adjusting a light amount. A zoom position (focal length), a focus position and an aperture diameter in the image taking optical system 101 are controlled by an optical system controller 106 that receives control signals from a system controller 108.

The image taking optical system 101 may be provided integrally with the image pickup apparatus, or may be attached to the image pickup apparatus as an interchangeable lens.

The image-pickup element 102 converts the object image into an electrical signal to output an image-pickup signal. The image pickup signal is converted into a digital signal by an A/D converter 103, and the digital image-pickup signal is input to an image processor 104. The image processor 104 performs various processing on the digital image-pickup signal to produce an image (captured image), and performs super-resolution processing (resolution increasing processing) as image processing to produce a high-resolution image (restored image) from the captured image (degraded image).

The image taking optical system 101, the image-pickup element 102 and the image processor 104 constitute an image obtaining part and an image acquiring part. The image processor 104 and the system controller 108 constitute a processing part.

The image produced by the image processor 104 is recorded to an image recording medium 107 or displayed on a displaying part 105.

Figure 2:
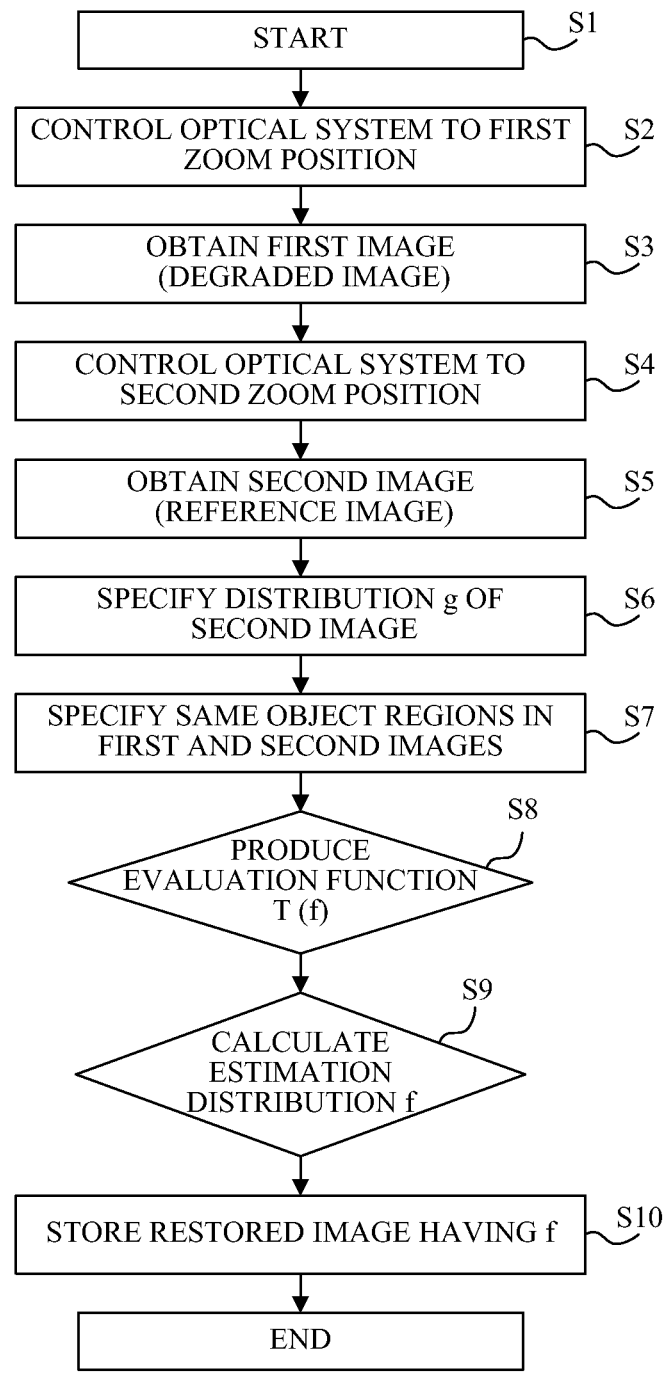
FIG. 2 is a flowchart showing processes performed by the image pickup apparatus of Embodiment 1.
Figure 3:
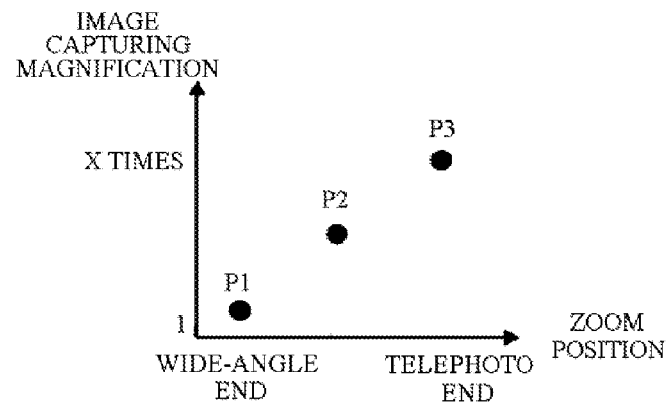
FIG. 3 shows a relationship between a zoom position and an image capturing magnification in Embodiment 1.

Next, description will be made of processes (operations) performed by the image pickup apparatus in a case where the image taking optical system 101 is a bifocal zoom lens with reference to a flowchart shown in FIG. 2. The bifocal zoom lens in this embodiment is an optical step zoom lens providing good optical performance with sufficiently corrected aberrations at a wide-angle end P1 and a telephoto end P3 shown in FIG. 3, but providing insufficient optical performance at a middle zoom position P2. The object 120a shown in FIG. 4 is an image capturing target object. The degraded image 120b corresponds to an image generated by image capturing at the middle zoom position P2. The constraint image 120c corresponds to an image generated by telephoto (enlarging) image capturing of part of the object 120a, that is, a person's face at the telephoto end P3. The image of the person's face in the constraint image 120c corresponds to a second object image, and the image of the object 120a in the degraded image 120b corresponds to a first object image.

Moreover, the processes shown in this flowchart are executed by the system controller 108 that is constituted by a microcomputer and controls the image taking optical system 101, the image-pickup element 102 and the image processor 104, according to an image processing program that is a computer program. This also applies to other embodiments which will be described later.

The system controller 108 receives an image capturing instruction signal generated in response to a user's operation at step S1, and then controls the zoom position of the image taking optical system 101 to a first zoom position (middle zoom position P2 in this embodiment) at step S2.

Next, the system controller 108 performs a first image capturing operation at step S3 in a state where the image taking optical system 101 is set to the first zoom position. The first image capturing operation generates a base image (first image) having a user-selected angle of view. This base image corresponds to the degraded image 120b shown in FIG. 4 since it is generated by the image capturing at the middle zoom position P2 where the image taking optical system 101 provides the insufficient optical performance.

After completion of the first image capturing operation, the system controller 108, at step S4, changes the zoom position of the image taking optical system 101 through the optical system controller 106 to a second zoom position (telephoto end P3 in this embodiment) at which the image capturing magnification is higher than that at the first zoom position.

Then, the system controller 108 performs a second image capturing operation in a state where the image taking optical system 101 is set at the second zoom position at step S5. The second image capturing operation generates a reference image (second image) corresponding to the constraint image 120c shown in FIG. 4. The reference image is a sufficiently high-resolution image since it has been generated by image capturing at the telephoto end P3 where the image taking optical system 101 provides the good optical performance.

The base image (degraded image) 120b and the reference image (constraint image) 120c are temporarily stored in a memory (not shown) provided in the image processor 104.

Next, the system controller 108 causes the image processor 104 to specify a distribution g of the base image 120b at step S6.

In addition, the system controller 108 causes the image processor 104 to specify, in the base image 120b, a region including a main object image (person's face image) included in the reference image 120c at step S7. The region specified by the image processor 104 in the base image 120b and a region (entire region) of the reference image 120c corresponding to the specified region are surrounded by the broken lines in FIG. 4, and are hereinafter referred to as "same object regions". The same object region may be specified by a commonality extraction method using edge extraction or the like.

Moreover, for specifying the same object region by comparison of the base and reference images 120b and 120c, the reference image 120c may be contracted to a same size as that of the base image 120b or the base image 120b may be enlarged to a same size as that of the reference image 120c.

Next, the system controller 108 causes the image processor 104 to perform the super-resolution processing based on the above-described super-resolution principle at step S8. The image processor 104 produces the evaluation function T(f) shown by the expression (14). This embodiment adds, to the term of Z(f) in the evaluation function T(f), the correlation function whose value reduces as the correlation of the same object regions in the base and reference images 120b and 120c increases. Such super-resolution processing enables restoration of the original image, in other words, production of a high-resolution restored image, which is a third image, with higher accuracy than conventional methods. The reference image 120c includes a higher frequency component of the object as compared with the base image 120b, so that this embodiment uses the reference image 120c (or part thereof) as the constraint condition. Such setting of the constraint condition makes it possible to restore the original image up to a higher frequency component with high accuracy as compared with a case of not employing the reference image 120c as the constraint condition. That is, an image with a higher resolving power can be restored.

Next, the system controller 108 causes the image processor 104 to calculate a distribution f minimizing the evaluation function by using the steepest descent method or the like at step S9.

Furthermore, the system controller 108 stores an image having the calculated distribution f as the restored image (third image) to the image recording medium 107 at step S10. Moreover, the system controller 108 causes the displaying part 105 to display the restored image.

This embodiment enables continuous zooming capable of maintaining high resolution even when using an image taking optical system performing step optical zooming. Moreover, this embodiment can produce the restored image using two images, that is, the base image and the reference image, which suppresses increase of a required capacity of the memory that stores the images. This also applies to a case of using an image taking optical system performing continuous optical zooming.

Embodiment 2

Figure 5:
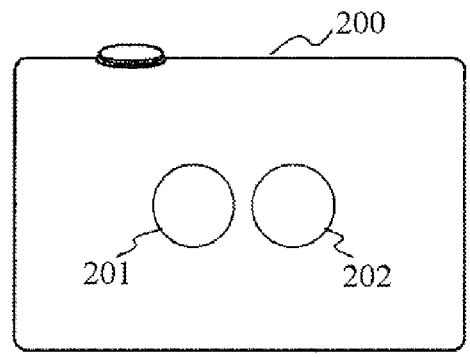
FIG. 5 is a block diagram showing a configuration of an image pickup apparatus that is Embodiment 2 of the present invention.

FIG. 5 shows an image pickup apparatus that is a second embodiment (Embodiment 2) of the present invention. An internal configuration of the image pickup apparatus of this embodiment is similar to that of the image pickup apparatus of Embodiment 1, and constituent components in this embodiment common to those in Embodiment 1 are denoted by the same reference numerals as those in Embodiment 1. The image pickup apparatus 200 of this embodiment is a twin-lens camera having two image taking optical systems 201 and 202 whose angles of view for image capturing (image capturing magnifications) are mutually different. The image taking optical system 201 has a focal length corresponding to the wide-angle end P1 shown in FIG. 3, and the image taking optical system 202 has a focal length corresponding to the telephoto end P3. The image taking optical system 201 is hereinafter referred to as a "wide-angle image taking optical system", and the image taking optical system 202 is hereinafter referred to as a "telephoto image taking optical system". Moreover, the image pickup apparatus 200 cannot perform image capturing at a focal length corresponding to the middle zoom position P2 shown in FIG. 3.

Figure 7:
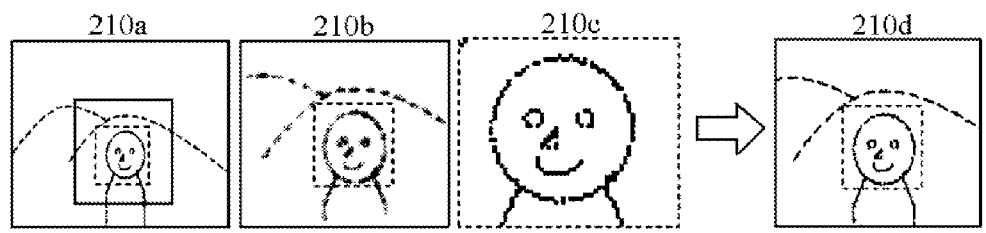
FIG. 7 shows captured images in Embodiment 3 of the present invention.

In FIG. 7, reference numeral 210a denotes an object that is an image capturing target, and reference numeral 210a also denotes an image generated by image capturing of that object through the wide-angle image taking optical system 201. This image 210a is hereinafter referred to as a "wide-angle image". Reference numeral 210b denotes an image generated by performing an expansion process (enlargement process) on a region surrounded by a solid line in the wide-angle image 210a. This image 210b corresponds to a first image, and is hereinafter referred to as an "expanded image". The expanded image 210b corresponds to a degraded image generated by image capturing at the middle zoom position P2. Reference numeral 210c denotes an image generated by image capturing of a region surrounded by a broken line in the object 210a (that is, a region including part of the object 210a) through the telephoto image taking optical system 202. This image 210c corresponds to a constraint image that is a second image, and is hereinafter referred to as a "telephoto image". The telephoto image 210c corresponds to an image captured at a higher image capturing magnification than that for the expanded image 210b.

In addition, reference numeral 210d denotes a restored image (third image) generated by super-resolution processing in this embodiment.

Figure 6:
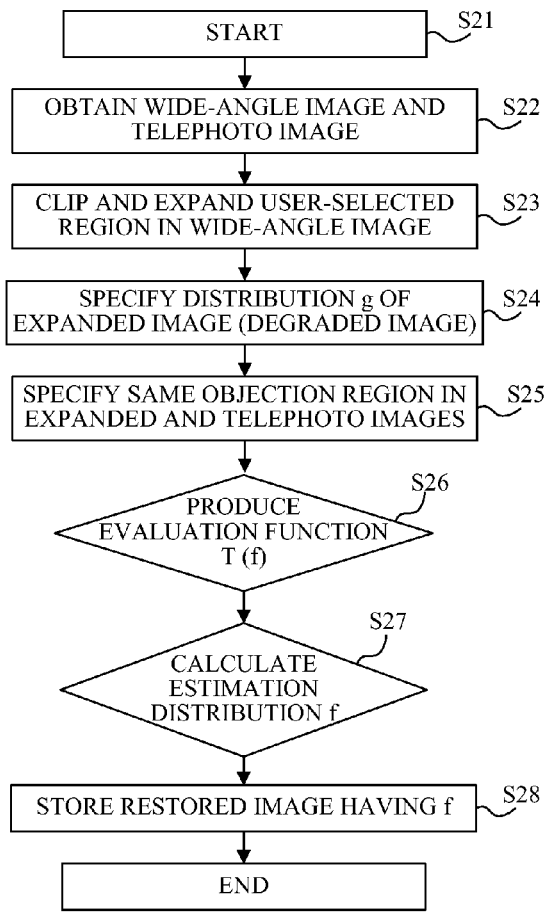
FIG. 6 is a flowchart showing processes performed by the image pickup apparatus of Embodiment 2.

Description will be made of processes (operations) performed by the image pickup apparatus 200 of this embodiment with reference to a flowchart shown in FIG. 6.

The system controller 108 receives an image capturing instruction signal generated according to a user's operation at step S21, and then simultaneously or sequentially obtained the wide-angle image 210a and the telephoto image (second image) 210c at step S22. Both the wide-angle and telephoto images 210a and 210c are sufficiently high-resolution images since they have been generated by image capturing through the wide-angle and telephoto image taking optical systems 201 and 202 providing good optical performance. The wide-angle image 210a and the telephoto image 210c are temporarily stored in a memory (not shown) provided in the image processor 104.

Next, the system controller 108 causes the image processor 104 to clip a user-selected partial region (partial image) from the wide-angle image 210a at step S23. Then, the system controller 108 causes the image processor 104 to perform the expansion process on the clipped partial image to produce the expanded image (first image) 210b. The expanded image 210b is an image produced by the expansion process using linear interpolation that is a digital zoom technique, so that the expanded image 210b is a degraded image. The expanded image 210b is temporarily stored in the memory provided in the image processor 104.

Next, the system controller 108 causes the image processor 104 to specify a distribution g of the expanded image 210b at step S24.

Moreover, the system controller 108 causes the image processor 104 to specify, in the expanded image 210b, a region including a main object image (person's face image) included in the telephoto image 210c at step S25. The region specified by the image processor 104 in the expanded image 210b and a region (entire region) of the telephoto image 210c corresponding to the specified region are surrounded by the broken lines in FIG. 7, and are hereinafter referred to as "same object regions". The same object region may be specified by a commonality extraction method using edge extraction or the like.

Moreover, for specifying the same object region by comparison of the expanded and telephoto images 210b and 210c, the telephoto image 210c may be contracted to a same size as that of the expanded image 210b or the expanded image 210b may be enlarged to a same size as that of the telephoto image 210c.

Next, the system controller 108 causes the image processor 104 to perform the super-resolution processing based on the above-described super-resolution principle at step S26. The image processor 104 produces the evaluation function T(f) shown by the expression (14). This embodiment adds, to the term of Z(f) in the evaluation function T(f), the correlation function whose value reduces as the correlation of the same object regions in the expanded and telephoto images 210b and 210c increases. Such super-resolution processing enables restoration of the original image, in other words, production of a high-resolution restored image, which is a third image, with higher accuracy than conventional methods. The telephoto image 210c includes a higher frequency component of the object as compared with the expanded image 210b, so that this embodiment uses the telephoto image 210c (or part thereof) as the constraint condition. Such setting of the constraint condition makes it possible to restore the original image up to a higher frequency component with high accuracy as compared with a case of not employing the telephoto image 210c as the constraint condition.

Next, the system controller 108 causes the image processor 104 to calculate a distribution f minimizing the evaluation function by using the steepest descent method or the like at step S27.

Furthermore, the system controller 108 stores an image 210d having the calculated distribution f as the restored image (third image) to the image recording medium 107 at step S28. Moreover, the system controller 108 causes the displaying part 105 to display the restored image.

This embodiment enables continuous zooming capable of maintaining high resolution even when using two image taking optical systems whose focal lengths are mutually different and fixed. Moreover, this embodiment can produce the restored image using three images, that is, the wide-angle image, the expanded image and the telephoto image, which suppresses increase of a required capacity of the memory that stores the images.

Embodiment 3

Figure 8:
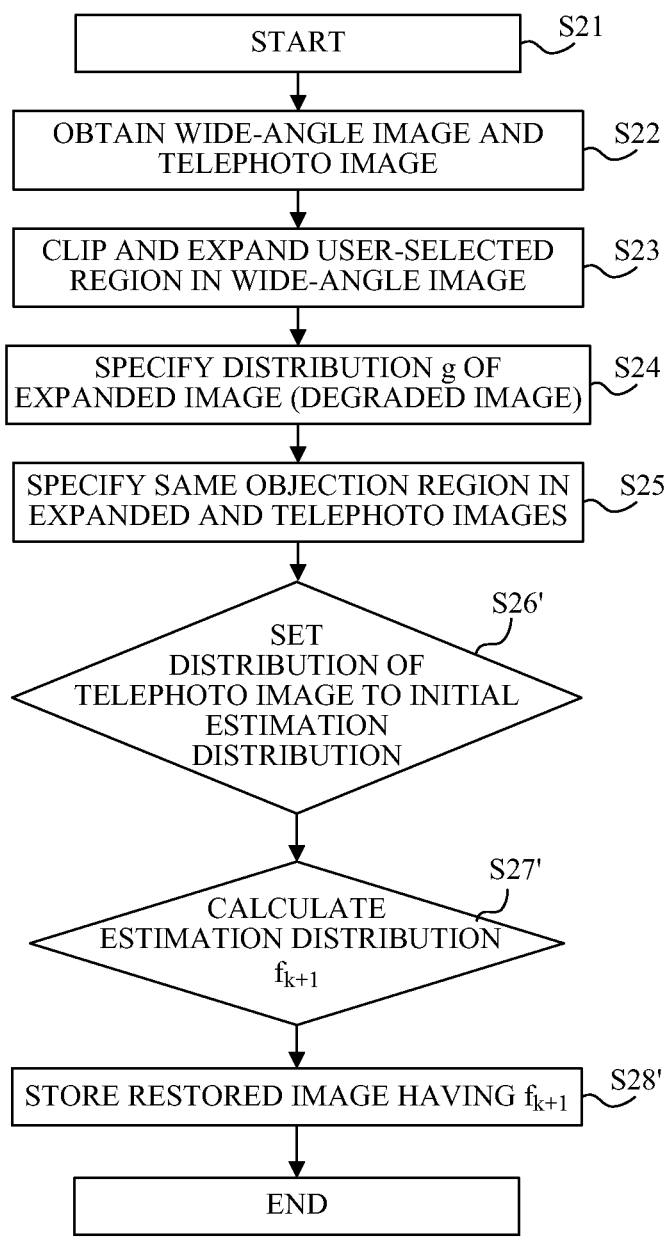
FIG. 8 is a flowchart showing processes performed in Embodiment 3.

FIG. 8 show a flowchart of processes performed in a twin-lens camera (image pickup apparatus) that is a third embodiment (Embodiment 3) of the present invention. A configuration of the camera of this embodiment is same as that of the camera of Embodiment 2, and processes are partially different from those in Embodiment 2. Processes at steps S21 to S25 are same as those in Embodiment 2.

The system controller 108 causes the image processor 104 to perform super-resolution processing at step S26'. The image processor 104 assumes that a distribution of the telephoto image 210c shown in FIG. 7, which corresponds to the same object region in the expanded image 210b, shows a distribution of the original image, and sets the assumed distribution to an initial estimation distribution. When the distribution of the expanded image 210b and the distribution of the telephoto image 210c as the original image are known, from the principle shown by the expression (11), the PSF that is the transfer characteristic of the image taking optical system can be restored. In other words, the degradation function of the same object region in the expanded image 210b can be restored in a frequency range of the telephoto image 210c.

Next, at step S27', the system controller 108 causes the image processor 104 to perform iterative calculation of the expression (11) by setting the restored degradation function to the transfer characteristic of the image taking optical system and setting the distribution g of the expanded image 210b to the initial estimation distribution.

Then, at step S28', the system controller 108 stores an image 210d having a distribution $f_{k+1}$ resulted by the iterative calculation to the image recording medium 107 as the restored image. Moreover, the system controller 108 displays the restored image on the displaying part 105.

This embodiment also enables continuous zooming capable of maintaining high resolution even when using two image taking optical systems whose focal lengths are mutually different and fixed. Moreover, this embodiment can produce the restored image using three images, that is, the wide-angle image, the expanded image and the telephoto image, which suppresses increase of a required capacity of the memory that stores the images.

Embodiment 4

Figure 9:
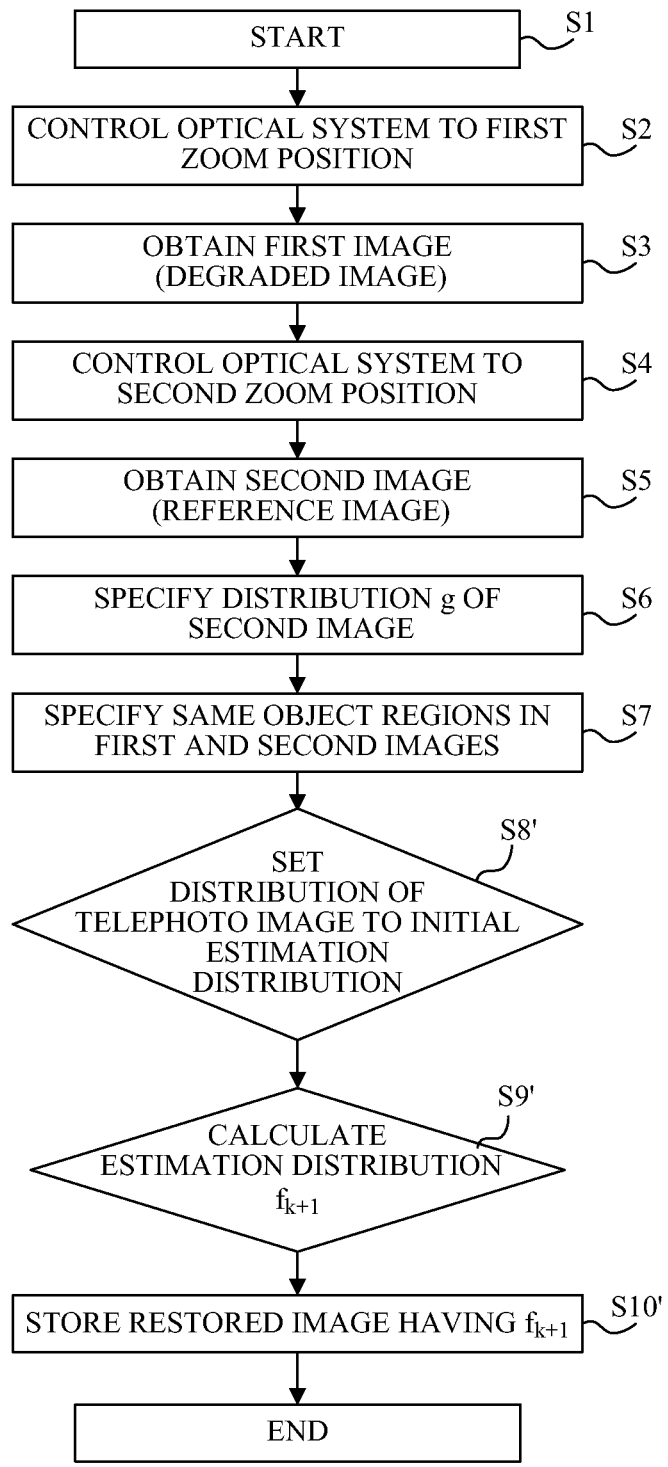
FIG. 9 is a flowchart showing processes performed in Embodiment 4 of the present invention.

FIG. 9 show a flowchart of processes performed in an image pickup apparatus that is a fourth embodiment (Embodiment 4) of the present invention. A configuration of the apparatus of this embodiment is same as that of the apparatus of Embodiment 1, and processes are partially different from those in Embodiment 1. Processes at steps S1 to S7 are same as those in Embodiment 1.

The system controller 108 causes the image processor 104 to perform super-resolution processing at step S8'. The image processor 104 assumes that a distribution of the reference image 120c shown in FIG. 4, which corresponds to the same object region of the base image 120b, shows a distribution of the original image, and sets the assumed distribution to an initial estimation distribution. When the distribution of the base image 120b and the distribution of the reference image 120c as the original image are known, from the principle shown by the expression (11), the PSF that is the transfer characteristic of the image taking optical system can be restored. In other words, the degradation function of the same object region in the base image 120b can be restored in a frequency range of the reference image 120c.

Next, at step S9', the system controller 108 causes the image processor 104 to perform iterative calculation of the expression (11) by setting the restored degradation function to the transfer characteristic of the image taking optical system and setting the distribution g of the reference image 120b to the initial estimation distribution.

Then, at step S10', the system controller 108 stores an image having a distribution $f_{k+1}$ resulted by the iterative calculation to the image recording medium 107 as the restored image (third image). Moreover, the system controller 108 displays the restored image on the displaying part 105.

This embodiment also enables continuous zooming capable of maintaining high resolution even when using an image taking optical system performing step optical zooming. Moreover, this embodiment can produce the restored image using two images, that is, the base image and the reference image, which suppresses increase of a required capacity of the memory that stores the images.

Although the above embodiments described the cases where the first and second images whose image capturing magnifications are mutually different are obtained by the step zoom camera or the twin-lens camera, these are merely examples, and the first and second images may be obtained by other methods such as changing of an object distance, performing of high-speed zooming that uses a refractive power variable element or the like, and using of images captured by different image pickup apparatuses.

Embodiment 5

Although the above embodiments described the case where the image processor 104 as an image processing apparatus is installed in the image pickup apparatus, alternative embodiments of the present invention are not limited thereto.

Figure 10:
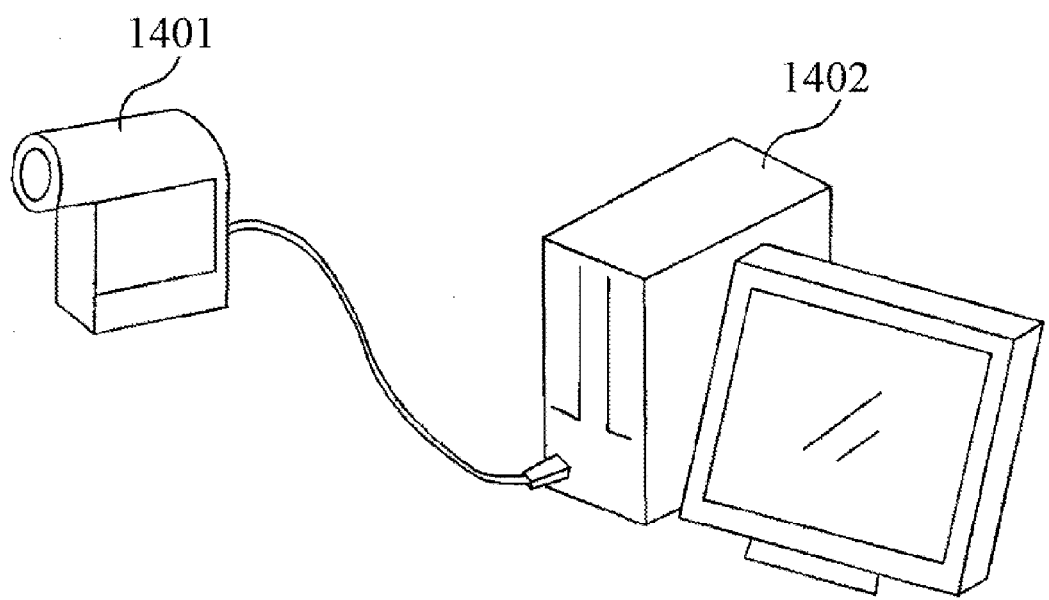
FIG. 10 diagrammatically shows a configuration of an image processing apparatus that is Embodiment 5 of the present invention.

For example, as shown in FIG. 10, an image pickup apparatus 1401 transmits a captured image to a personal computer 1402. The transmission of the captured image may be performed through a cable, wireless transmission, Internet or LAN.

The personal computer 1402 may perform the processing such as the super-resolution processing and the expansion process shown in FIGS. 2, 6, 8 and 9. In this case, the personal computer 1402 serves as the image processing apparatus including the image obtaining part and the processing part.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-059176, filed on Mar. 16, 2010, which is hereby incorporated by reference herein in its entirety.

What is claimed is:

1. An image processing apparatus comprising:
    an image obtainer configured to obtain a first image and a second image, the first image being an image generated by image capturing of an object as an original image or generated by expanding part of the image generated by the image capturing of the object, the first image including a first object image, the second image corresponding to an image captured at a higher image capturing magnification than that for the first image, and the second image including a second object image corresponding to part of the first object image; and a processor configured to perform an estimation of one of the original image and a degradation function in the image capturing by using the second image as a constraint condition, and configured to produce a third image whose resolution is higher than that of the first image by performing calculation processing using the first image and a result of the estimation.

2. An image processing apparatus according to claim 1, wherein the processor is configured to perform the estimation by calculation of a minimum value of the following evaluation function T(f):

$$T(f)=\|g(x)-C\times f(x)\|^2+\alpha Z(f)$$

where g(x) represents the first image, C represent a known degradation function in the image capturing, f(x) represents the original image, α represents a weighting factor, and Z(f) represents a constraint function corresponding to the constraint condition and including a correlation function that shows correlation between the first image and the second image.

3. An image processing apparatus according to claim 1, wherein the processor is configured to perform the estimation using, as the degradation function, a transfer function of an image taking optical system used in the image capturing, the transfer function being estimated from the second image.

4. An image pickup apparatus comprising:
an image capturing part configured to perform image capturing; and
an image processing apparatus,
wherein the image processing apparatus comprising:
an image obtainer configured to obtain a first image and a second image, the first image being an image generated by the image capturing of an object as an original image or generated by expanding part of the image generated by the image capturing of the object, the first image including a first object image, the second image corresponding to an image captured at a higher image capturing magnification than that for the first image, and the second image including a second object image corresponding to part of the first object image; and a processor configured to perform an estimation of one of the original image and a degradation function in the image capturing by using the second image as a constraint condition, and configured to produce a third image whose resolution is higher than that of the first image by performing calculation processing using the first image and a result of the estimation.

5. An image processing method comprising:
obtaining a first image and a second image, the first image being an image generated by image capturing of an object as an original image or generated by expanding part of the image generated by the image capturing of the object, the first image including a first object image, the second image corresponding to an image captured at a higher image capturing magnification than that for the first image, and the second image including a second object image corresponding to part of the first object image;
performing an estimation of one of the original image and a degradation function in the image capturing by using the second image as a constraint condition; and
producing a third image whose resolution is higher than that of the first image by performing calculation processing using the first image and a result of the estimation.

6. A non-transitory storage medium storing an image processing program for causing a computer to perform processing comprising:
obtaining a first image and a second image, the first image being an image generated by image capturing of an object as an original image or generated by expanding part of the image generated by the image capturing of the object, the first image including a first object image, the second image corresponding to an image captured at a higher image capturing magnification than that for the first image, and the second image including a second object image corresponding to part of the first object image;
performing an estimation of one of the original image and a degradation function in the image capturing by using the second image as a constraint condition; and
producing a third image whose resolution is higher than that of the first image by performing calculation processing using the first image and a result of the estimation.

* * * * *